Jan. 29, 1946.                J. S. STULL                2,393,719
                      ARTICLE ASSEMBLING APPARATUS
                      Filed June 10, 1944        4 Sheets-Sheet 1

INVENTOR
J. S. STULL
BY
ATTORNEY

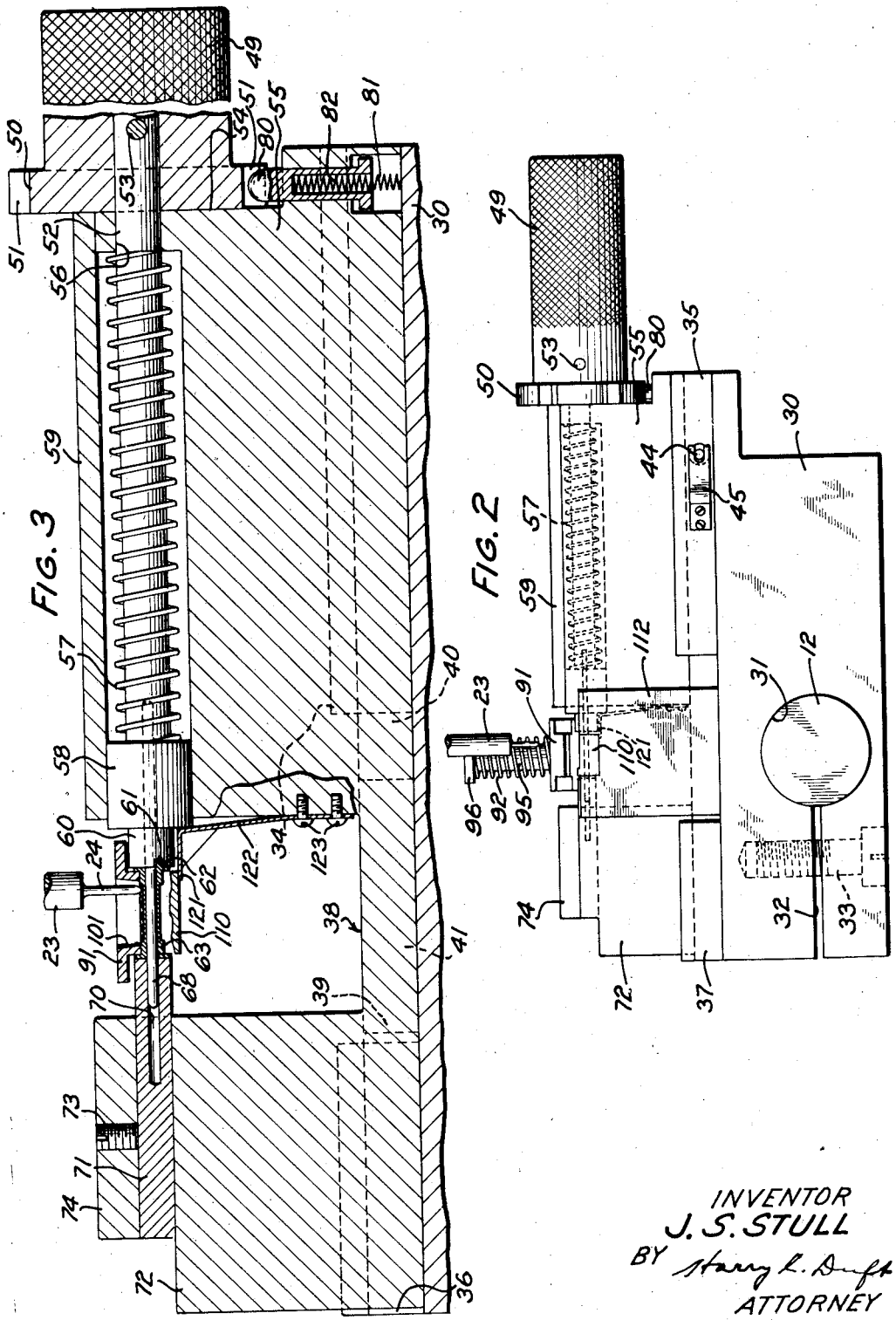

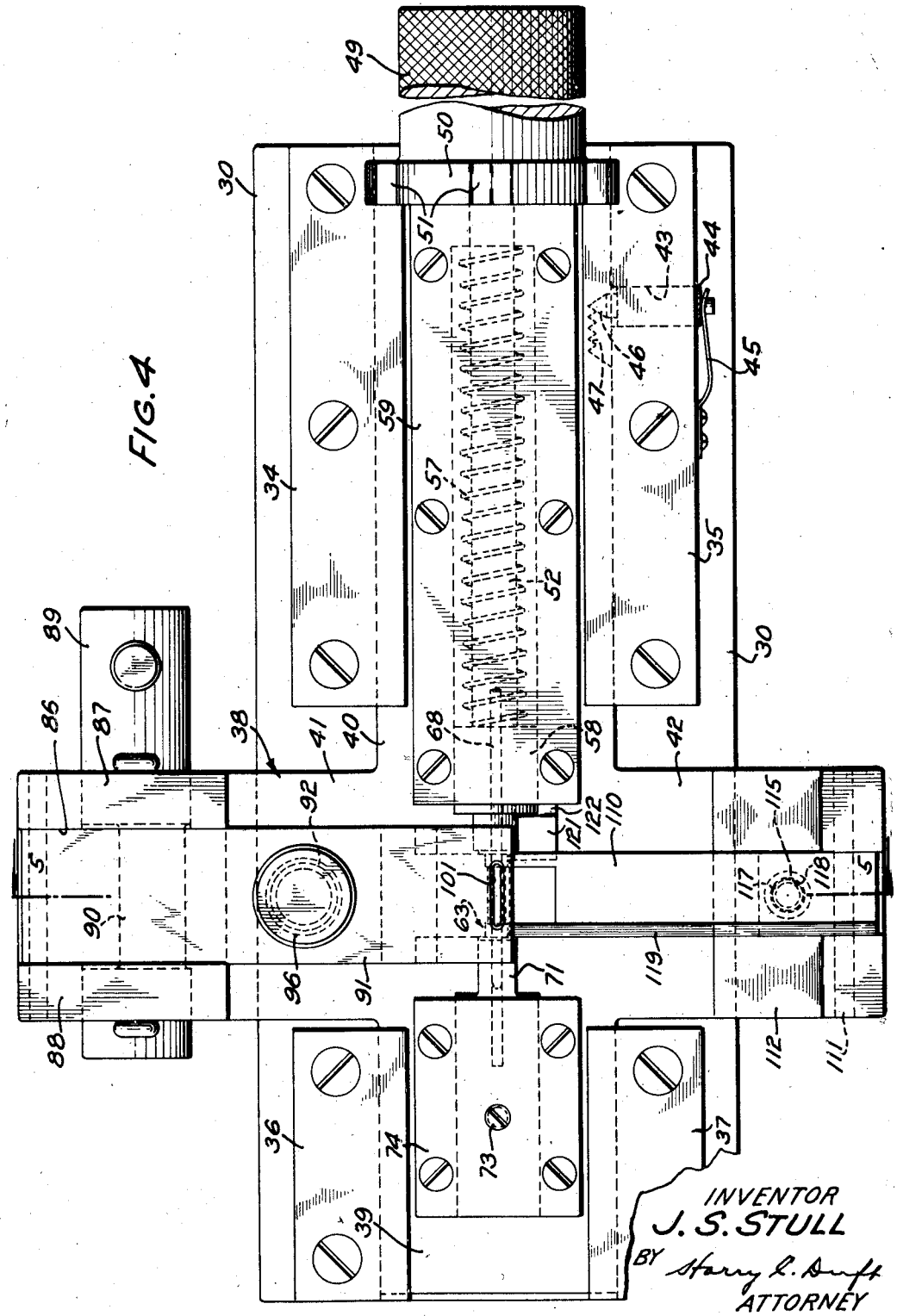

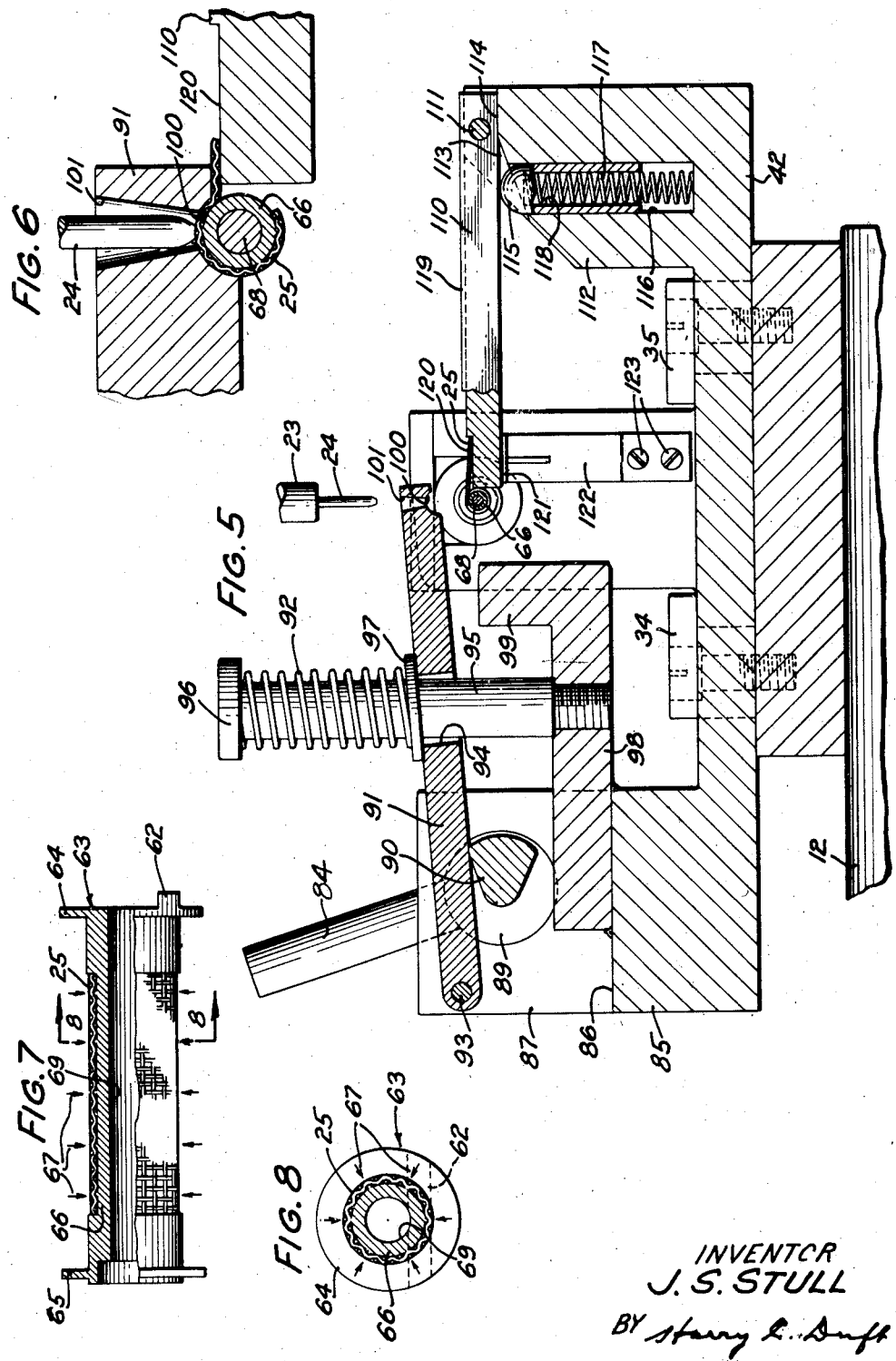

Patented Jan. 29, 1946

2,393,719

UNITED STATES PATENT OFFICE 2,393,719

ARTICLE ASSEMBLING APPARATUS

John S. Stull, Chicago, Ill., assignor to Western Electric Company, Incorporated, New York, N. Y., a corporation of New York Application June 10, 1944, Serial No. 539,716

9 Claims. (Cl. 219—4)

This invention relates to article assembling apparatus and more particularly to an apparatus for assembling a wire mesh on a cathode cylinder.

It is an object of the present invention to provide a simple apparatus for rapidly and accurately assembling two parts of an article.

In accordance with one embodiment of the invention, a cylindrical spool-like cathode member has a sheet of wire mesh screen spot-welded to it at a plurality of points about its periphery, the points of attachment of the wire mesh to the cathode being aligned longitudinally of the cathode member. In the apparatus, there is provided means for rotatably and reciprocably supporting the cathode cylinder for movement under a welding electrode which contacts the wire mesh sheet through a slot in a spring-pressed sheet-forming element. Reciprocation may be imparted to the cathode cylinder by reciprocating a holding fixture to a plurality of positions, where it will be held in proper position by a spring-pressed detent and rotation may be imparted to the cylinder by rotating a chuck portion which serves to support the cylinder in position beneath the electrode and form the screen to conform to the cylinder.

A complete understanding of the invention may be had by reference to the following detailed description of one embodiment thereof when considered in conjunction with the accompanying drawings, wherein Fig. 1 is a side elevational view of a welding apparatus made in accordance with the preferred form of the invention;

Fig. 2 is a fragmentary front elevational view, on a slightly enlarged scale, of the mechanism which supports the cathode cylinder during the welding of the mesh screen thereto;

Fig. 3 is a vertical sectional view, on an enlarged scale, taken substantially along the line 3—3 of Fig. 1 in the direction of the arrows and showing details of the spring-pressed chuck which supports the cathode cylinder during the welding of the mesh screen thereto;

Fig. 4 is a plan section taken substantially along the line 4—4 of Fig. 1 in the direction of the arrows and on the same scale as Fig. 3;

Fig. 5 is a transverse vertical sectional view taken substantially along the line 5—5 of Fig. 4 in the direction of the arrows showing details of the mechanism for forming the wire mesh and holding it on the cathode cylinder;

Fig. 6 is a fragmentary sectional view also taken along the line 5—5, but on a much more enlarged scale, showing the welding electrode engaging the screen in the position to weld it to the cathode cylinder;

Fig. 7 is an enlarged detail view, partly in section, of a cathode cylinder having a wire mesh screen attached thereto; and Fig. 8 is a sectional view taken substantially along the line 8—8 of Fig. 7 in the direction of the arrows, the last two views illustrating the article on a scale approximately four to one.

Figure 1:
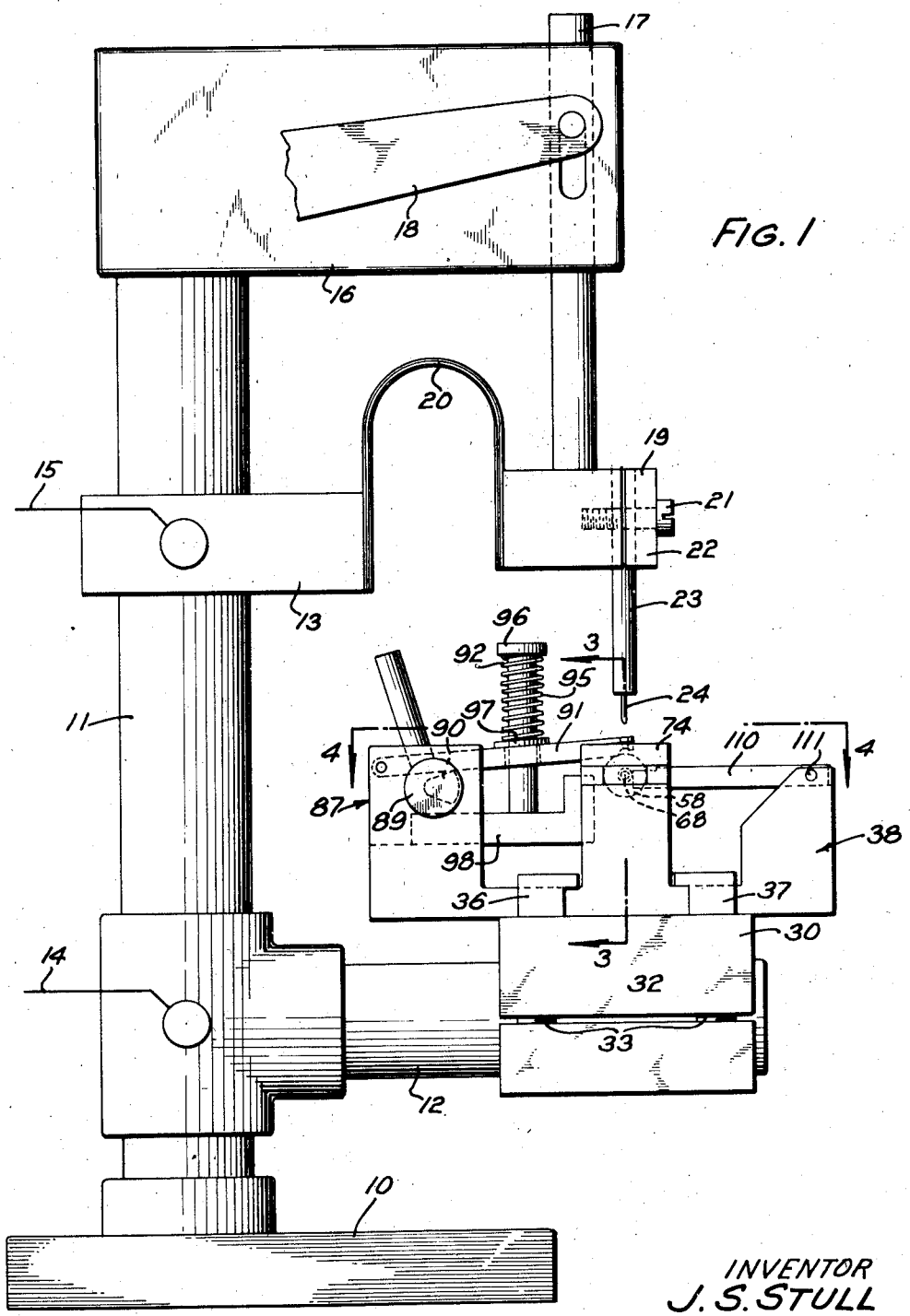

Referring to the drawings, wherein like reference characters designate the same parts throughout the several views, Fig. 1 shows some of the details of a welding apparatus of usual design modified in accordance with the present invention. The welding apparatus comprises a base 10, from which there extends a suitable standard 11 having lower and upper cross arms 12 and 13, respectively, insulatedly mounted thereon. The lower cross arm 12 may be connected to any suitable source of welding current through a lead 14 and the upper arm may be connected to the other side of the welding source through a lead 15. The lower cross arm 12 and the upper cross arm 13 are both fixed in position on the standard 11 and have superposed over them a head member 16. The head member 16 slidably supports a reciprocatory member 17, which may be reciprocated by means of the lever 18 to carry an upper welding head 19 insulatedly mounted thereupon in a vertical path. The welding head 19 is interconnected with the cross arm 13 by a flexible connection 20, as is usual in such mechanisms, and has electrically connected thereto, by means of a machine screw 21, a clamp assembly 22 and welding electrode 23. The lower end of the electrode 23 has a reduced welding portion 24 formed thereon, as shown in Fig. 1, for engagement with a sheet of wire mesh or screen 25, as shown most clearly in Fig. 6.

Attached to the lower cross arm 12 is a block 30 of conducting material, which has a suitable aperture 31 (Fig. 2) formed therein for surrounding the cross arm 12. Communicating with the aperture 31 is a slot 32, which forms the left side (Fig. 2) of the block 30 into two separate parts, through one of which a pair of clamping screws 33 extend, and into the other of which the clamping screws 33 are threaded, thereby to hold the block 30 in position on the cross arm 12. Mounted on the upper surface of the block 30 are two pairs of ways 34, 35, 36 and 37, which slidably support a cruciform support block, designated generally by the numeral 38, and comprising arms 39, 40, 41 and 42. The arm 39 extends under an edge of the ways 36 and 37 and the arm 40 extends under the edge of the ways 34 and 35, whereby the block 38 may be slid across the block 30.

Freely slidable in an aperture 43 (Fig. 4) in the way 35 is a plunger 44, which is urged towards the arm 40 by a bent leaf spring 45. The plunger 44 is provided with a point 46, adapted to engage in cooperating notches 47 in the arm 40, tending to hold the arm 40 in any one of five adjusted positions, there being five of the notches 47 formed in the arm 40.

Reciprocation may be imparted to the support block 38 by means of a knurled handle 49, which has formed integrally with it an annular shoulder portion 50, in which a series of six notches 51 are formed. The knurled handle 49 is fixed on the end of a plunger rod 52 by means of a pin 53 (Fig. 3) and the shoulder 50 is normally urged into engagement with a surface 54 of an upwardly extending portion 55 of the arm 40. The plunger rod 52 is slidably journalled in an aperture 56 in the portion 55 and is normally urged to the left (Fig. 3) by a compression spring 57 interposed between a surface of the portion 55 and an annular shoulder 58 formed on the rod 52. The shoulder 58 is slidable between the portion 55 and a cap plate 59 fixed on the upper surface of the portion 55.

Extending outwardly to the left (Fig. 3) from the shoulder 58 is a chuck member 60, which has a slot 61 formed in it to receive an extension 62 on a cathode cylinder 63. The cathode cylinder 63, as shown most clearly in Figs. 7 and 8, is provided with head portions 64 and 65 and a barrel portion 66. In the present apparatus, the barrel portion 66 of the cathode member 63 is adapted to have the screen or wire mesh 25 spot welded to it at the points indicated by the arrows 67 (Figs. 7 and 8). In addition to the slot 61 for receiving the projection 62 on the cathode 63, the rod 52 carries a pin 68 adapted to enter the central aperture 69 in the cathode 63. This pin 68 extends beyond the chuck member 60 a sufficient distance to pass completely through the cathode 63 and enter an aperture 70 formed in a plate 71. The plate 71 may be fixed in any one of the plurality of adjusted positions with respect to an upwardly extending portion 72 of the arm 39 by a set screw 73 threaded into a cover plate 74, suitably attached to the upwardly extending portion 72 of the arm 39. In this manner, the position of the cathode 63 may be very accurately regulated with respect to the reduced welding portion 24 of the welding electrode 23. The rotative position of the cathode 63, carried by the chuck 60 against the end of the plate 71, may be varied by rotating the knurled handle 49 and the rotative position of the cathode will be determined by a spring-pressed plunger 80 positioned in alignment with the shoulder 50 and adapted to enter the notches 51. This plunger is urged upwardly (Fig. 3) by a compression spring 81 seated in a pocket 82 in the plunger and bearing against the upper surface of the block 30.

The arm 41 of the support block 38, as shown most clearly in Figs. 4 and 5, has an upwardly extending portion 85 formed thereupon, which is slotted, as shown at 86, to provide a pair of bearing members 87 and 88 (Fig. 4), in which there is rotatably mounted a shaft 89. The central portion of the shaft 89 is cut away to form a cam 90, against which a lever 91 is urged by a compression spring 92 and the shaft is provided with an actuating handle 84, whereby the shaft may be rocked. The lever 91 is pivoted on a rod 93 and is provided with an aperture 94, through which there extends a post 95 having a head 96. The spring 92 encircles the post 95 and is interposed between a washer 97 bearing against the upper surface of the lever 91 and the head 96. The post 95 is suitably mounted on a bracket 98, which is, in turn, fixed to the base of the slot 86 and which carries an upwardly extending arm 99 in the path of the lever 91 so that when the cam 90 is moved to a position such that the lever 91 is permitted to move downwardly under the action of the spring 92, a substantially semi-circular notch 100 formed in the right end (Fig. 5) of the lever 91 will engage a screen 25 and clamp it against the barrel 66 of the cathode 63 held by the chuck 60. The right end (Fig. 5) of the lever 91 has a slot 101 formed in it, through which the reduced welding portion 24 of the welding electrode 23 may pass to contact the screen 25 and weld the screen to the barrel of the cathode.

To facilitate the positioning of the screen 25 with respect to the barrel of the cathode, a depressible support plate 110 is provided. This support plate is pivotally mounted upon a pin 111 fixed in an upwardly extending portion 112 of the arm 42, which is slotted at 113 to receive the support plate 110. The base of the slot 113 is so formed that the support plate 110 is prevented from rocking clockwise beyond the position shown in Fig. 5 due to the engagement of the right end of the plate with a surface 114 of the slot. The support plate 110 is normally urged upwardly by a plunger 115, the upper rounded end of which engages the undersurface of the plate 110. Seated in a recess 116 in the extending portion 112 of the arm 42 is a compression spring 117, which extends into a socket 118 in the plunger 115 for normally urging the plunger upwardly in the recess 116, thus to tend to hold the plate 110 in the position shown in Fig. 5.

The plate 110, as shown most clearly in Figs. 4 and 5, has a guide ridge 119 formed on it, against which a section of screen 25 may be placed by an operator for guiding the screen to a positioning recess 120 at the free end of the support plate 110. This recess 120 is so formed that when a suitably proportioned section of screen 25 is nested in it with the right edge thereof bearing against the right edge of the recess (Fig. 5), the left end of the screen will extend slightly beyond the axis of the cathode 63 held in the chuck 60, in which position the screen may be welded to the barrel 66 of the cathode.

As will be described more clearly in connection with the description of the operation of the apparatus, the support plate 110 may be rocked downwardly during the rotation of the apparatus, but whenever the plunger rod 52 is in the position shown in Fig. 3, the support plate 110 will be held in the position shown in Figs. 1 and 5 by an extending edge 121 of a leaf spring 122, which is normally biased to the right (Fig. 3) to lie flat against the left surface of the upwardly extending portion 55 of the arm 40, where the extending edge 121 of the spring 122 will be out of the path of the support plate 110. The spring 122 is fixed to the portion 55 of the arm 40 by means of machine screws 123.

In the operation of the apparatus, a cathode 63 may be positioned on the pin 68 by moving the plunger rod 52 to the right from the position shown in Fig. 3. The operator, in order to move the plunger rod 52 to the right, thus to disengage the pin 68 from the aperture 70 in the plate 71, may grip the knurled handle 49 and pull the plunger to the right, compressing the spring 57. Prior to moving the plunger rod 52 to the right, as viewed in Fig. 3, the shaft 89 may be rotated to the position shown in Fig. 5 by manipulating the handle 84, thus to rotate the shaft 89 and cause the cam 90 to lift the lever 91 against the action of spring 92. When the plunger rod 52 is retracted, the extending edge 121 of spring 122 will be removed from beneath the support plate 110 and the support plate may be depressed against the action of spring-pressed plunger 115 to permit the loading of a cathode 63 in the apparatus. When the cathode is properly located on the pin 68 with its projection 62 extending into the slot 61 of the chuck member 60, the handle 49 may be released and the pin 68 will then enter the aperture 70 to securely lock the cathode on the pin 68 and to the chuck 60. When the cathode is so positioned, a relatively large surface area thereof will be in engagement with supporting surfaces to provide a good electrical connection between the cathode cylinder 63 and the lead 14.

When the handle 49 approaches its operative position, as shown in Fig. 3, the shoulder 58 thereon will engage the spring 122 to move it under the support plate 110, which will have been released by the operator as soon as the cathode 63 has been mounted on the pin 68. Thus the support plate 110 will be held in its upper position (Fig. 5) while a section of screen 25 is moved into the recess 120. After the section of screen is properly positioned in the recess 25, the handle 84 may be manipulated to release lever 91 and permit its right end to engage the screen 25. The apparatus in this condition is holding the cathode and screen so that the first row of spot welds may be made between the screen and the barrel 66 of the cathode at the points designated by the arrows 67.

The spring 57, which urges the plunger rod 52 to the left (Fig. 3), is appreciably stronger than the leaf spring 45, which urges the point 46 of the plunger 44 into the notches 47 on the arm 40 and thus the support block 38 may be reciprocated by means of the handle 49 to the various positions where the point 46 of the plunger 44 will engage the notches 47 without compressing the spring 57. In this manner, the entire support block 38 may be shifted from right to left, as viewed in Fig. 4, and each time the plunger 44 engages in one of the notches 47, the lever 18 may be operated to contact the welding electrodes 23 with the screen, thus to spot weld the screen 25 to the barrel 66 of the cathode 63. As soon as one axially extending row of welds has been made between the screen and the barrel of the cathode, the knurled handle 49 may be rotated to cam the plunger 80 out of the notch 51, in which it had been resting, and to permit it to enter into the next succeeding notch 51. After the plunger 80 enters a new notch 51, a row of spot welds may be made between the screen and barrel, as described hereinbefore. This operation may be repeated six times to completely attach the screen 25 to the barrel 66 of the cathode. During the spot welding of the screen to the cathode, the screen will be held in intimate contact with the barrel of the cathode by the cooperating surfaces on the forward end of the lever 91.

What is claimed is:

1. In an apparatus for welding a screen to a cylindrical cathode member, a welding circuit, means conductively connected to the welding circuit for supporting the cathode member for rotation, means for slidably supporting said cathode member supporting means, a welding electrode connected to the welding circuit, means for reciprocating the welding electrode relative to the supporting means, and means for supporting a screen in superposed relation to the cathode member for welding thereto upon reciprocation of the welding electrode.

2. In an apparatus for welding a screen to a cylindrical cathode member, a welding circuit, means conductively connected to the welding circuit for supporting the cathode member for rotation, a support block for said supporting means, means for slidably supporting said block, a welding electrode connected to the welding circuit, means for reciprocating the welding electrode relative to the supporting means, and means for supporting a screen in superposed relation to the cathode member for welding thereto upon reciprocation of the welding electrode.

3. In an apparatus for welding a screen to a cylindrical cathode member, a welding circuit, means conductively connected to the welding circuit for supporting the cathode member for rotation, a support block for said supporting means, means for slidably supporting said block, a welding electrode connected to the welding circuit, means for reciprocating the welding electrode relative to the supporting means, a depressible support plate for positioning a screen in position to be welded to the cathode, and means for resiliently moving said plate into alignment with the cathode.

4. In an apparatus for welding a screen to a cylindrical cathode member, a welding circuit, means conductively connected to the welding circuit for supporting the cathode member for rotation, a support block for said supporting means, means for slidably supporting said block, a welding electrode connected to the welding circuit, means for reciprocating the welding electrode relative to the supporting means, means for supporting a screen in superposed relation to the cathode member for welding thereto upon reciprocation of the welding electrode, and means for holding the screen in contact with a portion of the surface of the cylindrical surface of the cathode.

5. In an apparatus for welding a screen to a cylindrical cathode member, a welding circuit, means conductively connected to the welding circuit for supporting the cathode member for rotation, a support block for said supporting means, means for slidably supporting said block, a welding electrode connected to the welding circuit, means for reciprocating the welding electrode relative to the supporting means, means for supporting a screen in superposed relation to the cathode member for welding thereto upon reciprocation of the welding electrode, and means for holding the screen in contact with a portion of the surface of the cylindrical surface of the cathode including a support plate for guiding the screen to the cathode and a lever having a forming surface for bending a portion of the screen into contact with the electrode.

6. In an apparatus for welding a screen to a cylindrical cathode member, a welding circuit, means conductively connected to the welding circuit for supporting the cathode member for rotation, a support block for said supporting means, means for slidably supporting said block, a welding electrode connected to the welding circuit, means for reciprocating the welding electrode relative to the supporting means, means for supporting a screen in superposed relation to the cathode member for welding thereto upon reciprocation of the welding electrode, and means operable under control of the means for supporting the cathode for rotation to hold the screen supporting means in alignment with the cathode when the cathode is held by its support.

7. In an apparatus for welding a screen to a cylindrical cathode member, a welding circuit, means conductively connected to the welding circuit for supporting the cathode member for rotation, a support block for said supporting means, means for slidably supporting said block, a welding electrode connected to the welding circuit, means for reciprocating the welding electrode relative to the supporting means, means for supporting a screen in superposed relation to the cathode member for welding thereto upon reciprocation of the welding electrode, and means movable into the path of the means for supporting the screen by the cathode supporting means to hold the screen supporting means in operative position.

8. In a welding apparatus, a reciprocatory welding electrode connected to one side of a welding circuit, a slidably mounted block connected to the other side of the welding circuit, means for conductively holding an article on said block, means for arresting movement of said block at predetermined points of its movement to align selected portions of the article with the electrode, means for rotating the holding means to present predetermined points on the article in alignment with said electrode, means for holding a second article in engagement with the first mentioned article, and means for reciprocating the reciprocatory electrode to weld the second article to the first article.

9. In an apparatus for welding a screen to the periphery of the barrel of a cathode, a welding electrode connected to one side of a source of welding current, means for reciprocating the electrode in a fixed path, and means for supporting parts to be welded together for movement in alignment with said electrode comprising a block conductively connected to the other side of the source of welding current, a support means slidably mounted on said block, means for clamping a cathode to said support means, means for positioning the support means at a plurality of positions, and means for rotating the clamping means.

JOHN S. STULL.